US012539793B2

(12) United States Patent
Panchani

(10) Patent No.: US 12,539,793 B2
(45) Date of Patent: Feb. 3, 2026

(54) VEHICLE SEAT WITH FOLD-FLAT POSITION

(71) Applicant: Atieva, Inc., Newark, CA (US)

(72) Inventor: Virat Panchani, Fremont, CA (US)

(73) Assignee: Atieva, Inc., Newark, CA (US)

( * ) Notice: Subject to any disclaimer, the term of this patent is extended or adjusted under 35 U.S.C. 154(b) by 140 days.

(21) Appl. No.: 18/480,869

(22) Filed: Oct. 4, 2023

(65) Prior Publication Data
US 2024/0157859 A1 May 16, 2024

Related U.S. Application Data

(60) Provisional application No. 63/383,888, filed on Nov. 15, 2022.

(51) Int. Cl.
*B60N 2/30* (2006.01)
*B60N 2/02* (2006.01)
*B60N 2/12* (2006.01)
*B60N 2/28* (2006.01)
(Continued)

(52) U.S. Cl.
CPC .............. *B60N 2/3065* (2013.01); *B60N 2/12* (2013.01); *B60N 2/2887* (2013.01); *B60N 2/3009* (2013.01); *B60N 2/682* (2013.01); *B60R 22/34* (2013.01); *B60N 2/02246* (2023.08)

(58) Field of Classification Search
CPC ..... B60N 2/3065; B60N 2/3011; B60N 2/206
See application file for complete search history.

(56) References Cited

U.S. PATENT DOCUMENTS 5,588,707 A * 12/1996 Bolsworth ........... B60N 2/3065
297/378.12
6,485,102 B1 * 11/2002 Moffa .................. B60N 2/2893
297/254
(Continued)

FOREIGN PATENT DOCUMENTS

CN 117485208 A * 2/2024
DE 10123776 A1 11/2002
(Continued)

OTHER PUBLICATIONS

International Search Report and Written Opinion for PCT Application No. PCT/US2023/075972, mailed on Jan. 31, 2024, 12 pages.

*Primary Examiner* — Eric J Kurilla
(74) *Attorney, Agent, or Firm* — Brake Hughes Bellermann LLP

(57) ABSTRACT

A vehicle seat comprises: first and second risers to engage with respective first and second rails on a floor of a vehicle; a seatback extending from a first pivot at the first and second risers; and a seat cushion mounted to the first and second risers using a four-bar linkage, wherein the seat cushion is not attached to the seatback and is not supported by the seatback; wherein the vehicle seat has (i) a comfort position in which a latch holds the seat cushion in a first position relative to the seatback, the seat cushion supported only by the four-bar linkage in the first position, and (ii) a fold-flat position in which the four-bar linkage is folded to position the seat cushion toward the floor, and in which the seatback is folded about the first pivot and assumes a second position at least partially overlapping the seat cushion.

16 Claims, 14 Drawing Sheets

(51) Int. Cl.
  *B60N 2/68*  (2006.01)
  *B60R 22/34*  (2006.01)

(56) References Cited

U.S. PATENT DOCUMENTS

| | | | | |
|---|---|---|---|---|
| 6,908,155 | B1* | 6/2005 | Wieclawski | B60N 2/36 |
| | | | | 297/378.12 |
| 7,300,107 | B2* | 11/2007 | Kammerer | B60N 2/3065 |
| | | | | 296/65.09 |
| 9,688,164 | B2 | 6/2017 | Vikstrom et al. | |
| 9,987,955 | B2* | 6/2018 | Ecker | B60N 2/309 |
| 11,376,993 | B2 | 7/2022 | Banales Cano et al. | |
| 11,752,911 | B1* | 9/2023 | Ubale | B60N 2/0252 |
| | | | | 297/408 |
| 2008/0197653 | A1* | 8/2008 | Lawall | B60N 2/3075 |
| | | | | 296/65.09 |
| 2009/0001795 | A1* | 1/2009 | Homier | B60N 2/22 |
| | | | | 297/340 |
| 2010/0026033 | A1* | 2/2010 | Homier | B60N 2/309 |
| | | | | 296/65.08 |
| 2011/0316317 | A1* | 12/2011 | Sprenger | B60N 2/3011 |
| | | | | 297/344.1 |
| 2016/0039316 | A1* | 2/2016 | Dill | B60N 2/3065 |
| | | | | 297/361.1 |
| 2017/0001546 | A1* | 1/2017 | Keyser | B60N 2/2227 |
| 2018/0281630 | A1* | 10/2018 | Shimizu | B60N 2/3065 |
| 2018/0281634 | A1* | 10/2018 | Furukawa | B60N 2/3011 |
| 2018/0281688 | A1* | 10/2018 | Matsunami | B60N 2/3065 |
| 2019/0016234 | A1* | 1/2019 | Keyser | B60N 2/02246 |
| 2020/0108739 | A1* | 4/2020 | Veine | B60N 2/3011 |
| 2021/0237623 | A1* | 8/2021 | Abe | B60N 2/20 |
| 2023/0135531 | A1* | 5/2023 | Kim | B60N 2/919 |
| | | | | 297/378.1 |
| 2024/0067062 | A1* | 2/2024 | Frank | B60N 2/3065 |

FOREIGN PATENT DOCUMENTS

| | | |
|---|---|---|
| DE | 20114059 U1 | 1/2003 |
| FR | 3034062 A3 * | 9/2016 |

* cited by examiner

VEHICLE SEAT WITH FOLD-FLAT POSITION

CROSS-REFERENCE TO RELATED APPLICATION

This application claims benefit, under 35 U.S.C. § 119, of U.S. Provisional Patent Application No. 63/383,888, filed on Nov. 15, 2022, entitled "VEHICLE SEAT WITH FOLD-FLAT POSITION", the disclosure of which is incorporated by reference herein in its entirety.

TECHNICAL FIELD

This document relates to a vehicle seat with a fold-flat position.

BACKGROUND

Vehicle seats can be designed for the dual purposes of providing a seat for an occupant, and being folded to provide a load floor for luggage or other vehicle cargo. Some existing sport utility vehicles (SUVs) allow their second-row and optionally third row-seats to be folded to provide a substantially flat load floor; however, the mechanical approaches that have been used may result in the load floor being positioned at a significant height above the vehicle floor (and therefore at a significant height above the ground as well). As another example, at least one existing minivan uses captain's chairs in the second row, which can be folded into compartments formed in the so-called body-in-white of the vehicle (i.e., the frame or bodywork of the vehicle that provides its constituent structure). However, the latter approach is not applicable where the space below the vehicle floor is used for another purpose, such as to house a battery pack of an electric vehicle.

SUMMARY

In an aspect, a vehicle seat comprises: first and second risers to engage with respective first and second rails on a floor of a vehicle; a seatback extending from a first pivot at the first and second risers; and a seat cushion mounted to the first and second risers using a four-bar linkage, wherein the seat cushion is not attached to the seatback and is not supported by the seatback; wherein the vehicle seat has (i) a comfort position in which a latch holds the seat cushion in a first position relative to the seatback, the seat cushion supported only by the four-bar linkage in the first position, and (ii) a fold-flat position in which the four-bar linkage is folded to position the seat cushion toward the floor, and in which the seatback is folded about the first pivot and assumes a second position at least partially overlapping the seat cushion.

Implementations can include any or all of the following features. The four-bar linkage comprises: a first bar extending from a first riser pivot on the first riser to a first seat pivot on a second bar on the seat cushion; a third bar extending from a second seat pivot on the second bar to a second riser pivot on the first riser, wherein the first riser forms a fourth bar of the four-bar linkage; a fifth bar extending from a third riser pivot on the second riser to a third seat pivot on a sixth bar on the seat cushion; and a seventh bar extending from a fourth seat pivot on the sixth bar to a fourth riser pivot on the second riser, wherein the second riser forms an eighth bar of the four-bar linkage. The latch is positioned on one of (i) the four-bar linkage or (ii) the first or second risers, and wherein the latch engages with a striker to hold the seat cushion in the first position relative to the seatback, the striker positioned on another one of (i) the four-bar linkage or (ii) the first or second risers. The vehicle seat comprises first and second latches for the first and second risers, respectively. The seatback further comprises connection links each having a first end at the first pivot, and each having a second end at a second pivot, wherein a remainder of the seatback is coupled to the second pivot, the connection links positioned at opposite sides of the seatback. The vehicle seat further comprises a cross member extending between the connection links. The vehicle seat further comprises at least one child-seat attachment point on the cross member. Orientations of the connection links are adjusted using the second pivot before the seatback is folded about the first pivots and assumes the second position overlapping the seat cushion. The vehicle seat further comprises a first shaft extending along the first pivot, and a second shaft extending along the second pivot. The second pivot, and not the first pivot, is used for comfort adjustment of the seatback. The vehicle seat also has (iii) an easy entry position in which the seatback is rotated using the second pivot and the vehicle seat is moved along the first and second rails. The vehicle seat is part of a split seat row in the vehicle, the split seat row including a wider portion and a narrower portion. The vehicle seat is the wider portion of the split seat row. The wider portion of the split seat row further comprises a center seat, the center seat cantilevered by the vehicle seat. The vehicle seat is the narrower portion of the split seat row. The vehicle seat further comprises a seatbelt retractor supported by a plate extending between the first and second risers. A seatbelt webbing extends from the seatbelt retractor and through the vehicle seat to a top of the seatback, and wherein the seatbelt webbing has anchors at the first and second risers.

BRIEF DESCRIPTION OF DRAWINGS

Like reference symbols in the various drawings indicate like elements.

DETAILED DESCRIPTION

Figure 1:
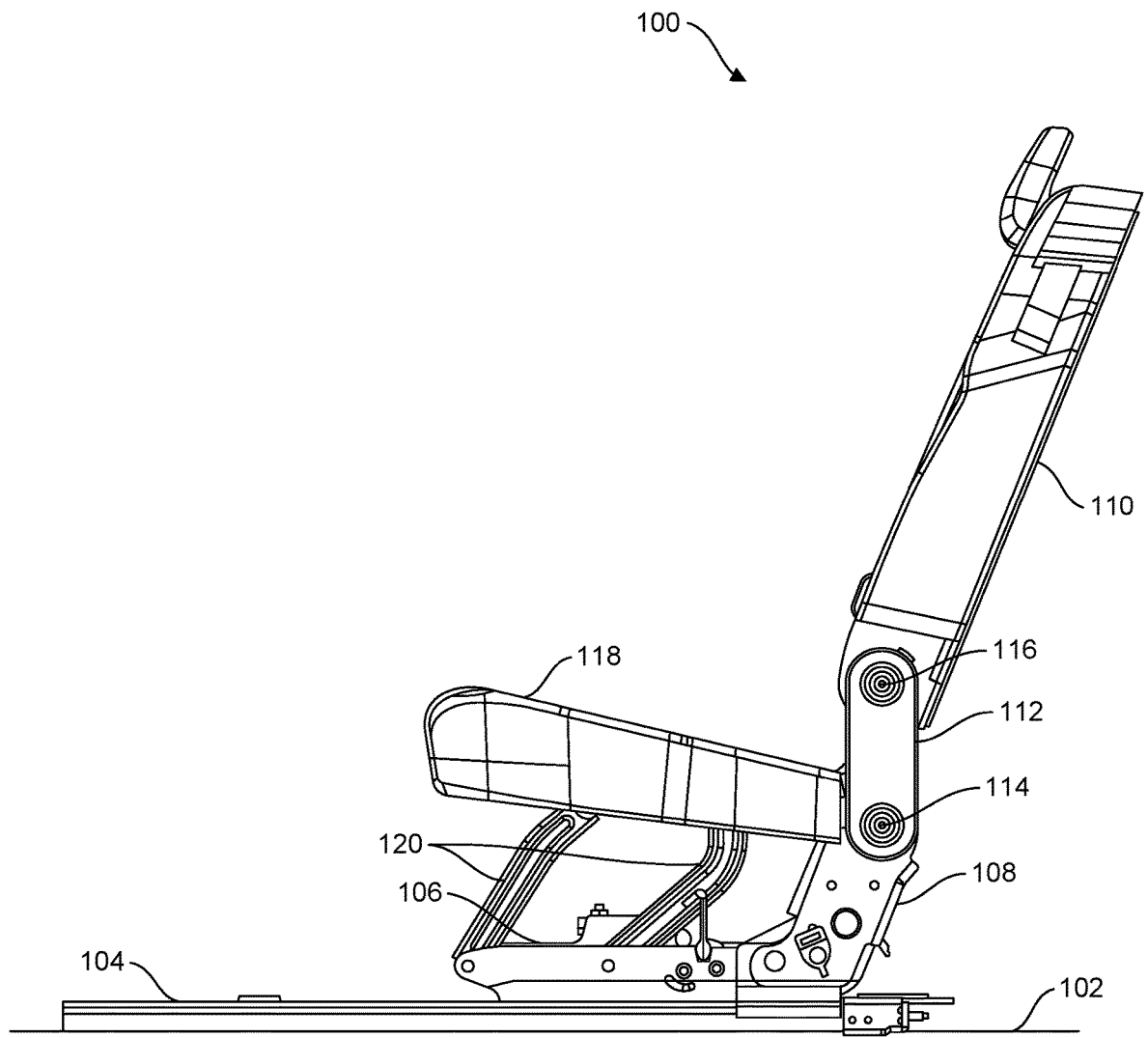
FIG. 1 shows an example of a vehicle seat in a comfort position.

This document describes examples of systems and techniques that provide a vehicle with a row of one or more robust and utilitarian seats that can also be folded away to provide a flat load floor at a conveniently low load level. In some implementations, the vehicle seat has a seat cushion that in a comfort position is suspended only by a four-bar linkage and does not rest against a seatback of the seat. The four-bar linkage allows the seat cushion to be folded down in a fold-flat position where the seat cushion is positioned toward a floor of the vehicle. The seatback, moreover, can have at least one pivot, allowing it to be folded into a position overlapping the seat cushion.

The present subject matter can provide improved seating and loading capability for different types of vehicles. A vehicle is sometimes characterized in terms of the height of its load floor. For example, some minivans have been recognized as providing a relatively low load floor, which can simplify loading or cargo and make it easy for occupants to enter the vehicle. On the other hand, in such vehicles occupants may be seated at a relatively low level based on the low load floor. Indeed, another vehicle characteristic is the height at which occupants are seated in the vehicle (sometimes referred to as "H point" with reference to the expected elevation of a nominal occupant's hip joint.) SUVs are often referred to as providing relatively high H points compared to other types of vehicles, while many of these SUVs also suffer from the disadvantage of having a relatively high load floor.

In contrast to the above, a vehicle according to the present subject matter can be designed to have a high H point like an SUV, but a low load floor like a minivan. Such a vehicle can have a row of one or more seats according to the present subject matter, where the seats are easily placed into a comfort position with a high H point for the occupant; or the seats are conveniently stowed away into a fold-flat position to boast a significant cargo space of essentially unparalleled proportions in its vehicle class. The approach by which the present seat can be stowed into the fold-flat position is particularly advantageous in that it does not require any space for storage within the body-in-white, which in some implementations (i.e., electric vehicles) can instead be used for accommodating a battery pack of significant capacity.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

In the following, examples of vehicle seats will be described, including some operations of folding/unfolding or stowing/deploying with regard to the seats. In some implementations, the seat movement can be at least partially automated by way of motorized operation powered by the vehicle itself. For example, a power recliner or other actuator can use electric energy to rotate and/or translate mechanical components relative to each other. In other implementations, the operation can be manual, meaning that the user manually provides the necessary force. As such, the following description covers both automated and manual operation.

FIG. 1 shows an example of a vehicle seat 100 in a comfort position. The vehicle seat 100 can be used with one or more other examples described elsewhere herein. Some portions of the vehicle seat 100 are omitted in the illustrations for clarity.

The vehicle seat 100 is positioned on rails that are mounted to a floor 102 of the vehicle. One or more rails can be used, and a rail 104 supporting the vehicle seat 100 is here visible. The vehicle seat 100 can have one or more risers for engaging with the rail(s) 104, and a riser 106 of the vehicle seat 100 is here shown as positioned on the rail 104. The vehicle seat 100 can have a bracket 108 extending from the riser 106. For example, the bracket 108 can be a portion of the riser 106 that extends away from the rail 104, or the bracket 108 can be a separate piece that is mounted to the riser 106.

The vehicle seat 100 has a seatback 110 for supporting the upper body of the occupant. The seatback 110 can include a frame covered by a cushion and/or trim. The seatback 110 can include a connection link 112 that allows for folding or other adjustment. The connection link 112 can have a first end at a pivot 114, such that the seatback 110 including the connection link 112 extends from the pivot 114. The connection link 112 has a second end (e.g., opposite the first end) at a pivot 116. That is, a remainder of the seatback 110 other than the connection link 112 can be coupled to the pivot 116 and thereby to the connection link 112. As used herein, the pivot 114 continues through the seatback 110 in a direction into the present illustration so that the pivot 114 extends from side to side of the seatback 110; similarly, the pivot 116 continues through the seatback 110 in a direction into the present illustration so that the pivot 116 extends from side to side of the seatback 110. The vehicle seat 100 can have two instances of the connection link 112 positioned at opposite sides of the seatback 110, of which only one is visible in the present view.

The vehicle seat 100 can have a seat cushion 118 for an occupant to sit on when the vehicle seat 100 is in the comfort position. The seat cushion 118 can include a frame covered by a cushion and/or trim. The seat cushion 118 is mounted to the riser 106 using a four-bar linkage 120. The seat cushion 118 is not attached to the seatback 110 and is not supported by the seatback 110. That is, the seat cushion 118 can be free and does not rest on anything except the four-bar linkage 120. For example, the seat cushion 118 does not rest against the bracket 108. In the comfort position of the vehicle seat 100 (e.g., the shown position), a gap can exist between an end of the seat cushion 118 and a lowermost end of the seatback 110. In some implementations, the gap can be covered by a filler piece. For example, the filler piece can be attached to the seatback 110.

The pivot 114 and/or 116 can be used in performing one or more functions of the vehicle seat 100. In some implementations, the pivot 114 can be used when stowing the vehicle seat 100 into a fold-flat position. For example, this can allow the seatback 110 to assume a position at least partially overlapping the seat cushion 118. In some implementations, the pivot 116 can be used when adjusting the seatback 110 in a comfort position (e.g., for greater or lesser incline). For example, this comfort adjustment can be done using only the pivot 116 and not the pivot 114. In some implementations, the pivot 116 can be used when placing the vehicle seat 100 into an easy entry position (e.g., to create a wider opening for an occupant to enter a subsequent row of seats in the vehicle).

FIGS. 2A-2D show examples 200-206 of moving the vehicle seat 100 of FIG. 1 between the comfort position and a fold-flat position. Any of the examples 200-206 can be used with one or more other examples described elsewhere herein. In the example 200, the seatback 110 is currently in any of the multiple positions that the seatback 110 can assume when the vehicle seat 100 is in the comfort position. The seat cushion 118 is no longer in the comfort position; rather, the seat cushion 118 has been rotated about the four-bar linkage 120, in a counterclockwise direction in the present view, in a direction away from the seatback 110. Rotations in the example 200 are here schematically represented by an arrow 208. For example, this motion can be facilitated by unlatching the seat cushion using a latch 210. Due to the four-bar linkage 120, the rotation in the example 200 can initially cause the seat cushion 118 to be elevated higher than in the comfort position, and thereafter to descend toward the floor 102.

Before the seat cushion 118 is unlatched, the vehicle can check that the vehicle seat 100 is in a rearmost position on the rails 104 (e.g., so that an uppermost part of the seatback 110 will clear the backs of any seat in a row in front of the vehicle seat 100 in the fold-flat position). For example, this check is performed using an electronic sensor after a user input, such as pressing a button. If the vehicle seat 100 is not presently in the correct position, the vehicle seat 100 can first be moved rearward on the rails 104. Other than the feature just described, the vehicle seat 100 may not move along the rails 104 in any of the examples 200-206.

In the example 202, the seat cushion 118 has been folded to a position toward the floor 102. For example, a part of the seat cushion 118 and/or a part of the four-bar linkage 120 can rest on the floor 102 and/or on the rails 104. The seat cushion 118 is now positioned significantly lower than in the comfort position (e.g., FIG. 1), providing substantial clearance for obtaining a low flat load floor in the vehicle. The seatback 110 may not have been moved from the comfort position in the situation shown in the example 202.

In the example 204, the connection link 112 can be rotated about one or both of the pivots 114 and 116 to move the seatback 110. The connection link 112 can be rotated in either direction. In some implementations, the connection link 112 is rotated so that the pivot 116 is positioned substantially above the pivot 114 in a vertical direction. The remainder of the seatback 110 other than the connection link 112 can also or instead be rotated about the pivot 116. For example, the remainder of the seatback 110 can be substantially aligned with a longitudinal axis of the connection link 112. Rotations in the example 204 are here schematically represented by an arrow 212. As such, orientations of the one or more connection links 112 can be adjusted using at least the pivot 116 before the seatback 110 is folded about the pivot 114 and assumes a position overlapping the seat cushion 118 (to be described next).

In the example 206, the seatback 110 is folded about the pivot 114 and assumes a position at least partially overlapping the seat cushion 118. Rotations in the example 206 are here schematically represented by an arrow 214. The seatback 110 is now positioned essentially flat against the seat cushion 118, thereby providing a low flat load floor in the vehicle. For example, the seatback 110 is substantially parallel to the floor 102 (e.g., horizontal) in the example 206.

Figure 2A:
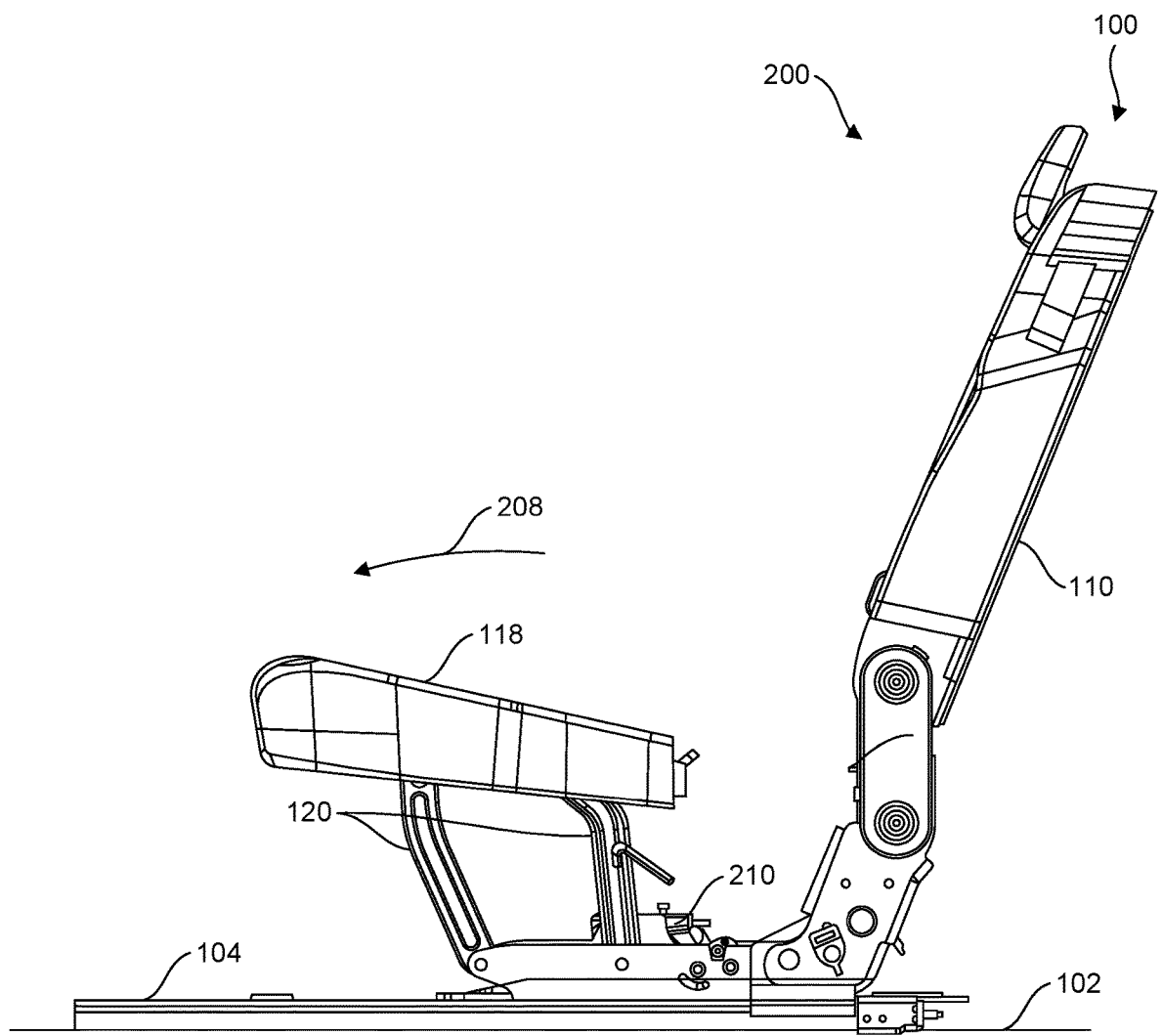
FIGS. 2A-2D show examples of moving the vehicle seat of FIG. 1 between the comfort position and a fold-flat position.
Figure 2B:
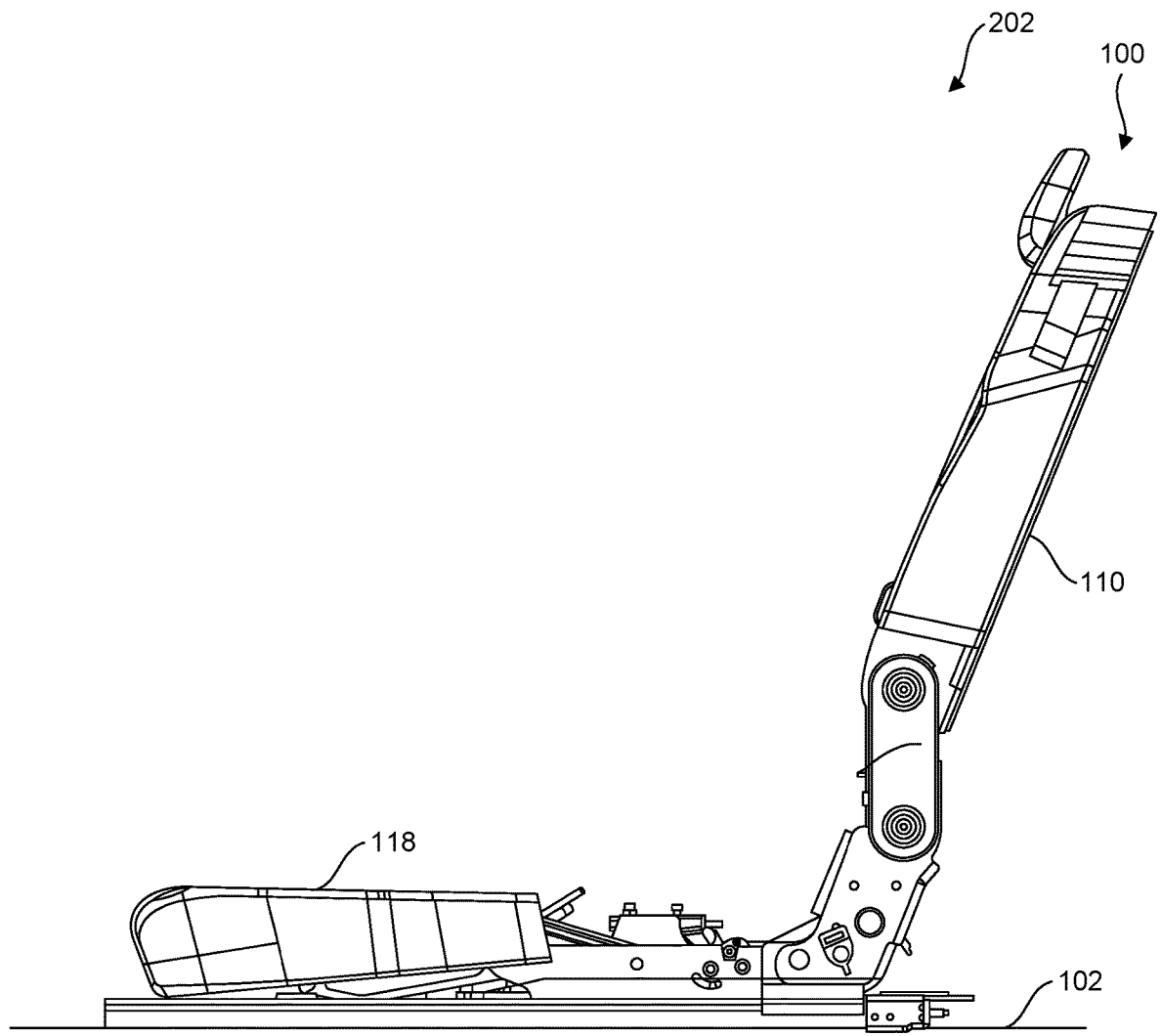
Figure 2C:
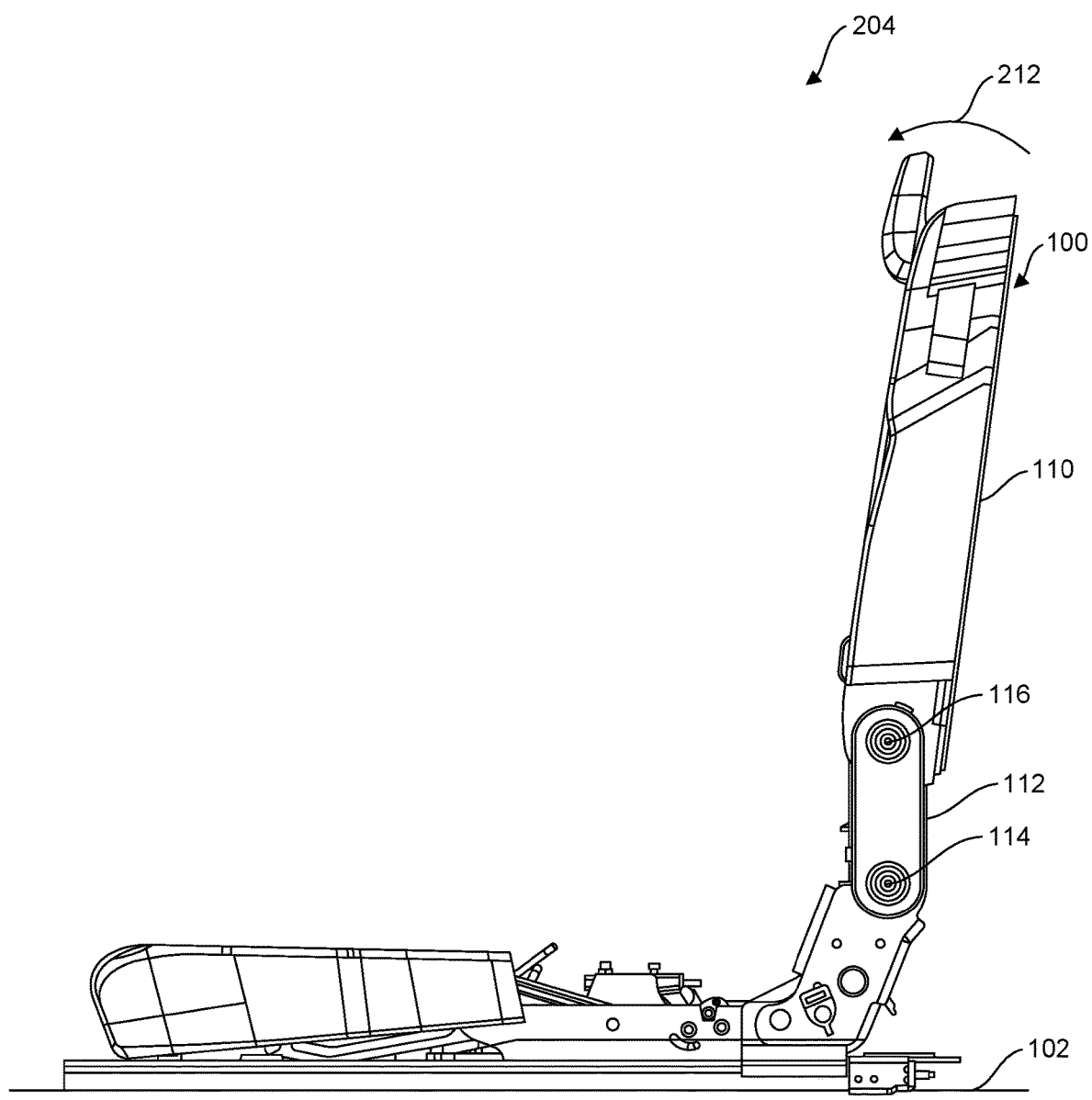
Figure 2D:
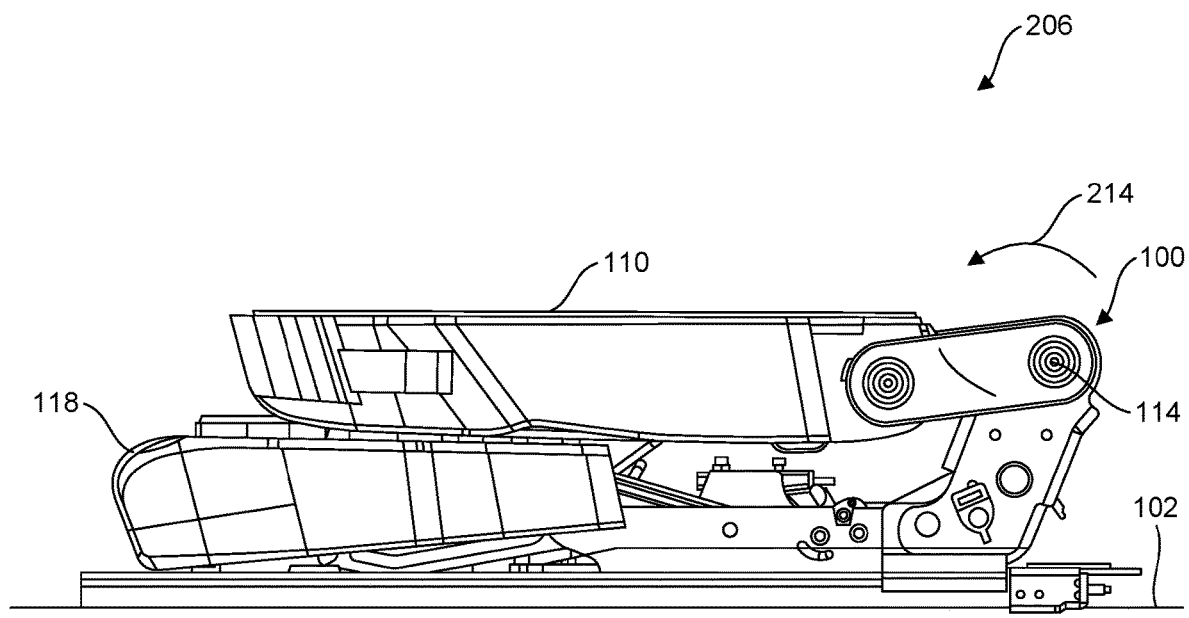

The present example illustrates that the vehicle seat 100 can include first and second risers (e.g., the risers 106 in FIG. 1) to engage with respective first and second rails (e.g., the rails 104) on a floor of a vehicle (e.g., the floor 102). The vehicle seat 100 can include a seatback (e.g., the seatback 110) extending from a first pivot (e.g., the pivot 114) at the first and second risers. The vehicle seat 100 can include a seat cushion (e.g., the seat cushion 118) mounted to the first and second risers using a four-bar linkage (e.g., the four-bar linkage 120). The seat cushion may not be attached to the seatback and is not supported by the seatback. The vehicle seat 100 can have a comfort position (e.g., as shown in FIG. 1) in which a latch (e.g., the latch 210) holds the seat cushion in a first position relative to the seatback, wherein the seat cushion is supported only by the four-bar linkage in the first position. The vehicle seat 100 can have a fold-flat position (e.g., as shown in FIG. 2D) in which the four-bar linkage is folded to position the seat cushion toward the floor, and in which the seatback is folded about the first pivot and assumes a second position at least partially overlapping the seat cushion.

Figure 3A:
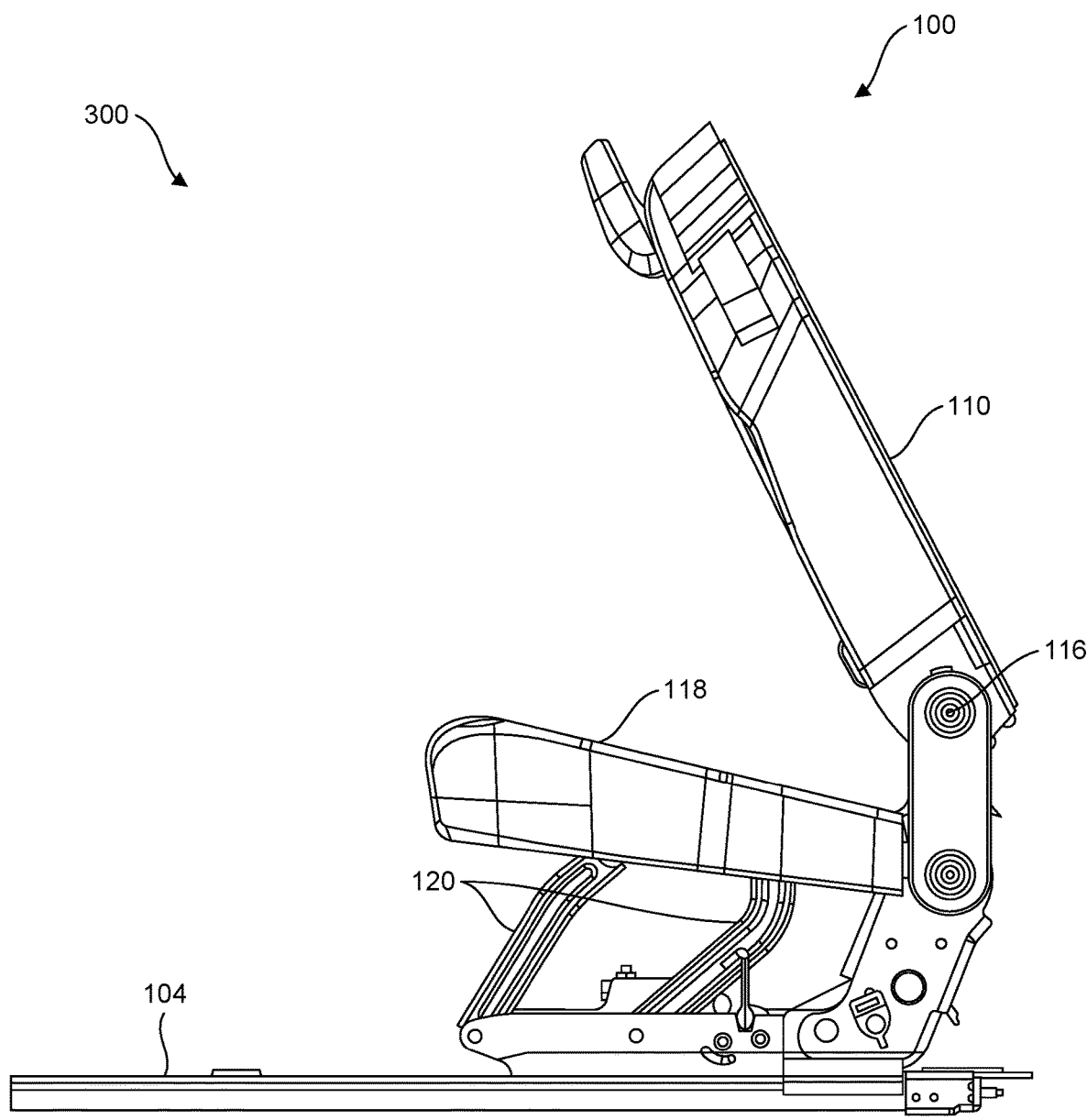
FIGS. 3A-3B show examples of moving the vehicle seat of FIG. 1 between the comfort position and an easy entry position.
Figure 3B:
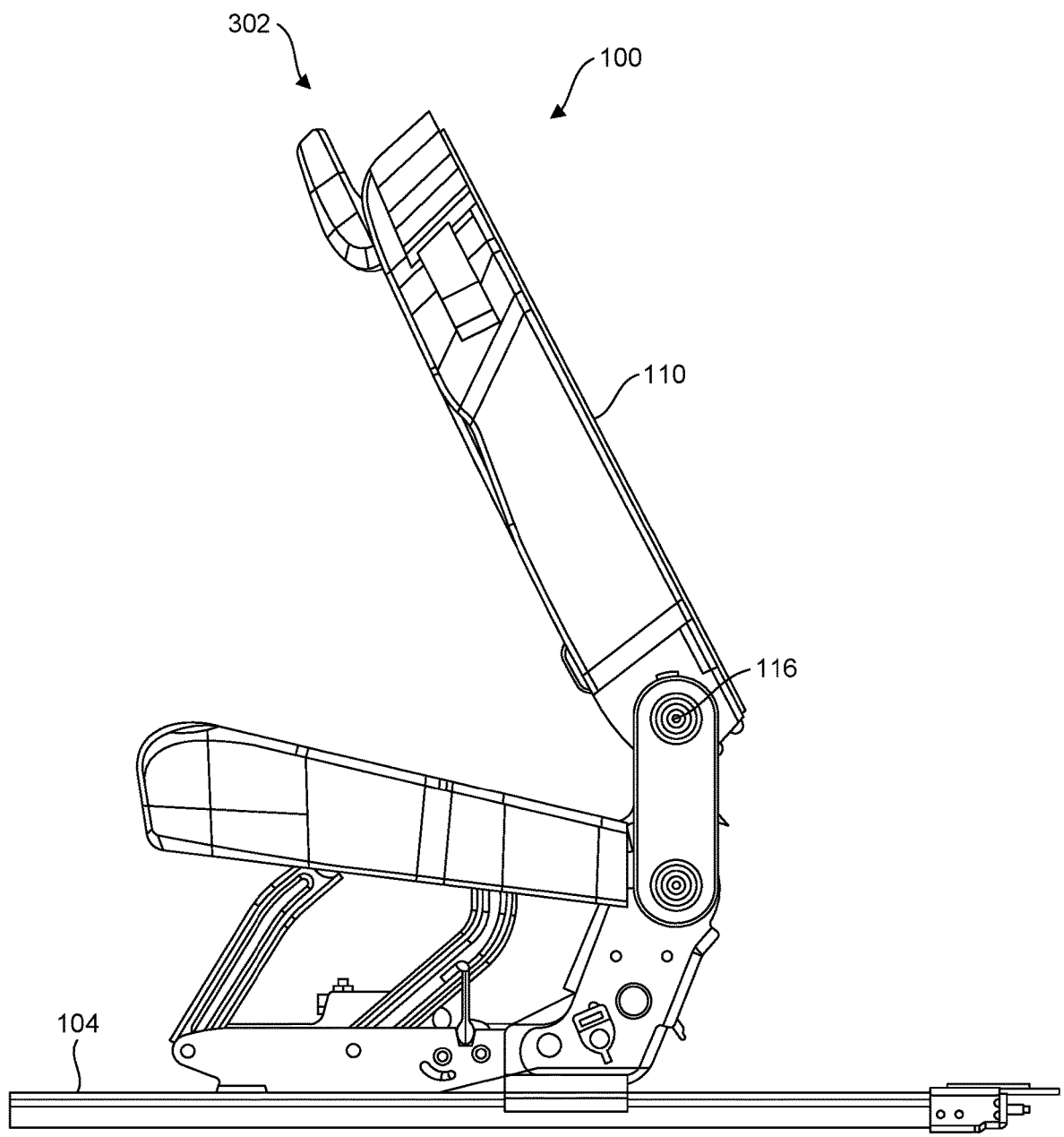

The vehicle seat 100 can also support one or more other movements, for example as will now be described. FIGS. 3A-3B show examples 300-302 of moving the vehicle seat 100 of FIG. 1 between the comfort position and an easy entry position. Any of the examples 300-302 can be used with one or more other examples described elsewhere herein.

In the example 300, the vehicle seat 100 is at the rearmost position on the rail 104. The seatback 110 has been rotated from the comfort position (e.g., FIG. 1), counterclockwise in the present view, about the pivot 116. By contrast, the seat cushion 118 may not have been rotated in the example 300. As such, the seat cushion 118 is presently supported only by the four-bar linkage 120.

In the example 302, the vehicle seat 100 has been moved along the rails 104. For example, this can involve moving the vehicle seat 100 towards a preceding row of seats in the vehicle. As such, the vehicle seat 100 can presently create a wider opening for an occupant to enter a subsequent row of seats in the vehicle. As such, the example 302 can be characterized as an easy entry position in which the seatback 110 is rotated using the pivot 116 and the vehicle seat 100 is moved along the rails 104.

Figure 4:
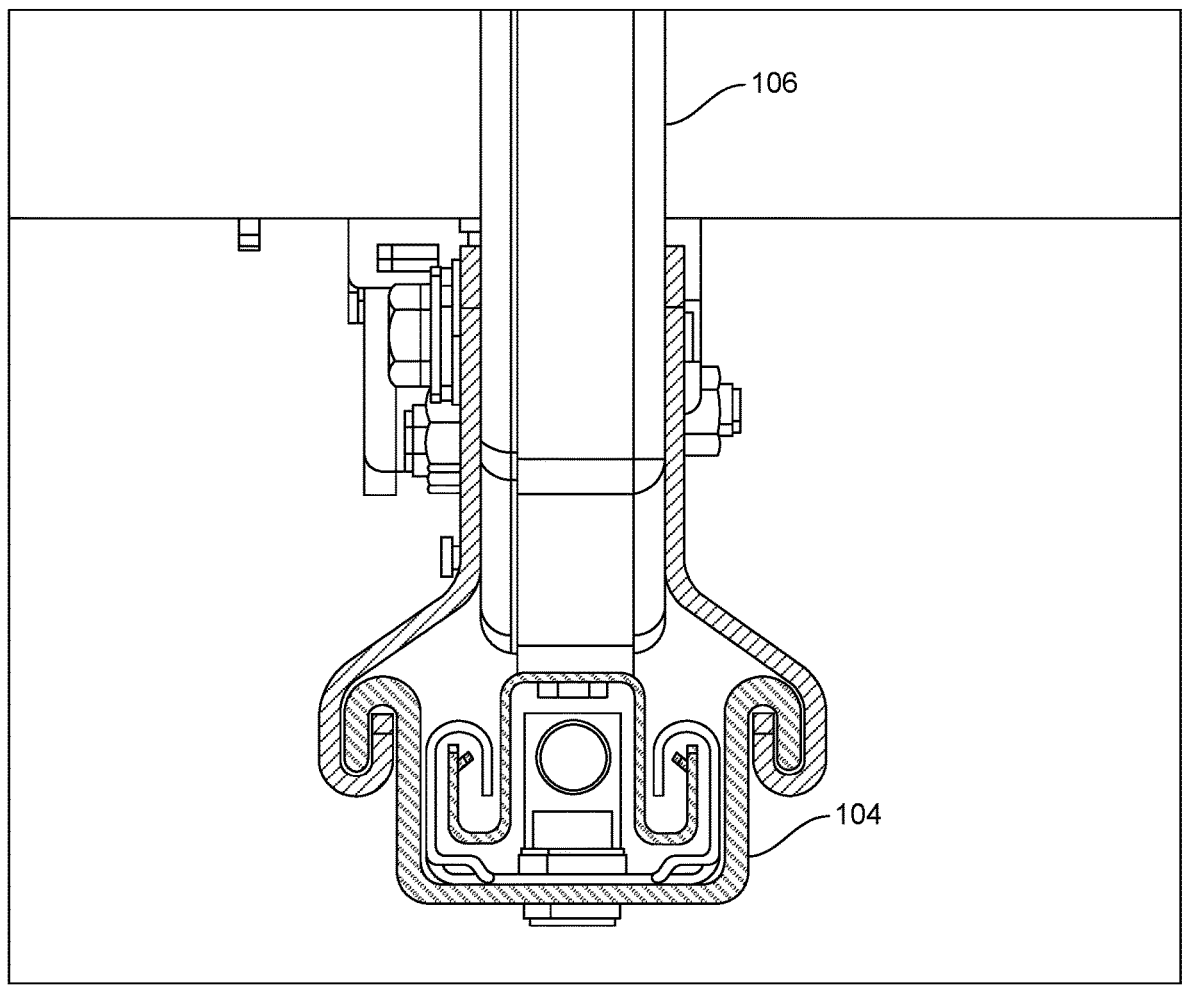
FIG. 4 shows an example of the rail and the riser of FIG. 1.

FIG. 4 shows an example of the rail 104 and the riser 106 of FIG. 1. The mechanical interaction between the rail 104 and the riser 106 allows the vehicle seat 100 (e.g., FIG. 1) to be selectively moved, or to be firmly held in place, along the rail 104.

Figure 5:
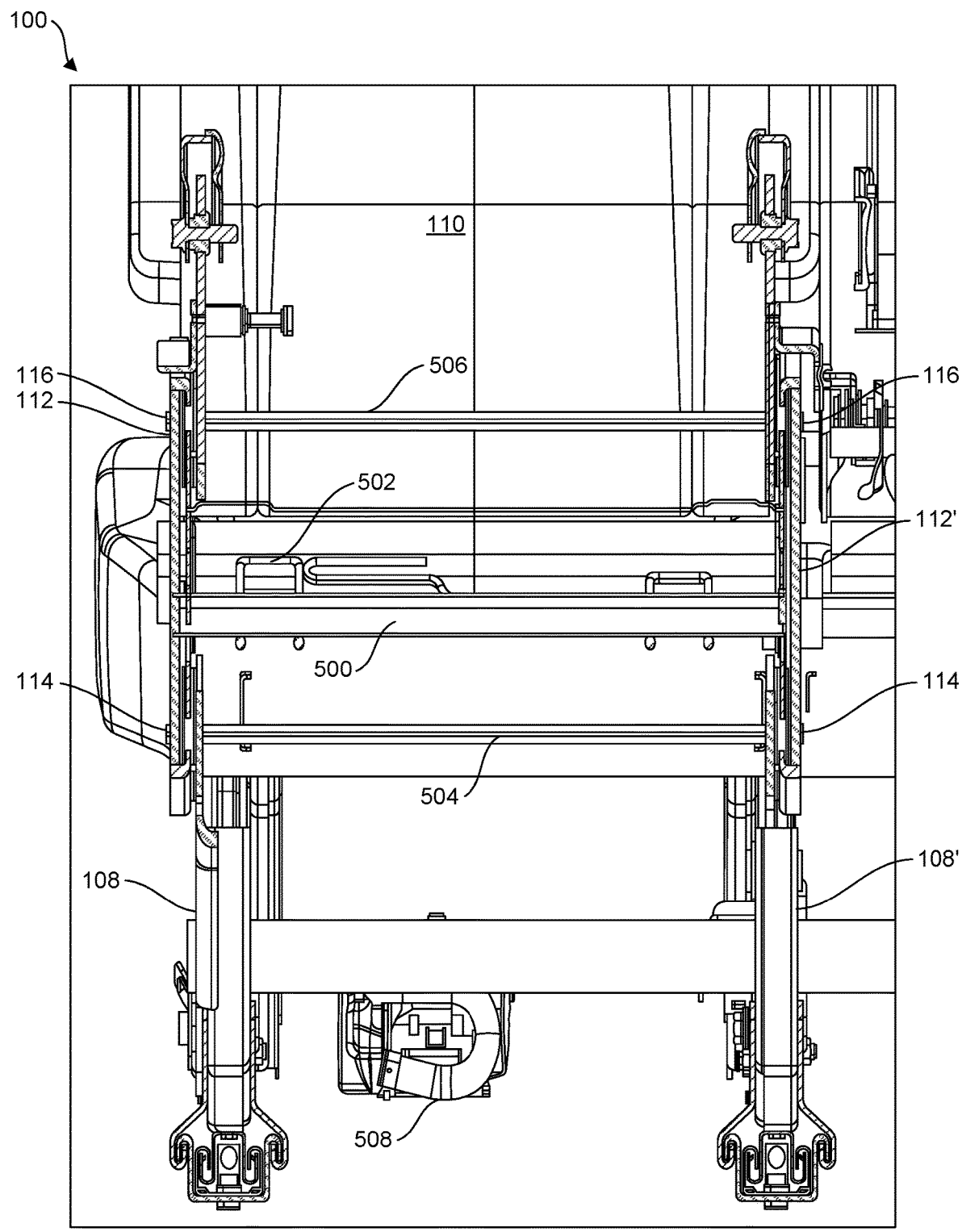
FIG. 5 shows an example of a rear view of the vehicle seat of FIG. 1.

FIG. 5 shows an example of a rear view of the vehicle seat 100 of FIG. 1. The vehicle seat 100 has the connection link 112 and, on the other side of the seatback 110, a connection link 112'. The connection links 112 and 112' can be substantially similar to each other (e.g., identical, or mirror image designs). The vehicle seat 100 has a cross member 500 extending between the connection links 112 and 112'. The cross member 500 can perform one or more functions with regard to the vehicle seat 100. In some implementations, one or more child-seat attachment points 502 can be provided on the cross member 500. For example, the child-seat attachment points 502 can be used as an anchor point according to the ISOFIX standard relating to child safety seats.

The pivots 114 and 116 are shown to extend from side to side of the seatback 110. The vehicle seat 100 can have a shaft 504 extending along the pivot 114. The vehicle seat 100 can have a shaft 506 extending along the pivot 116.

The vehicle seat 100 can have a seatbelt retractor 508. In some implementations, the seatbelt retractor 508 is mounted underneath the vehicle seat 100, such as between the bracket 108 and a bracket 108' on the other side of the vehicle seat 100.

Figure 6:
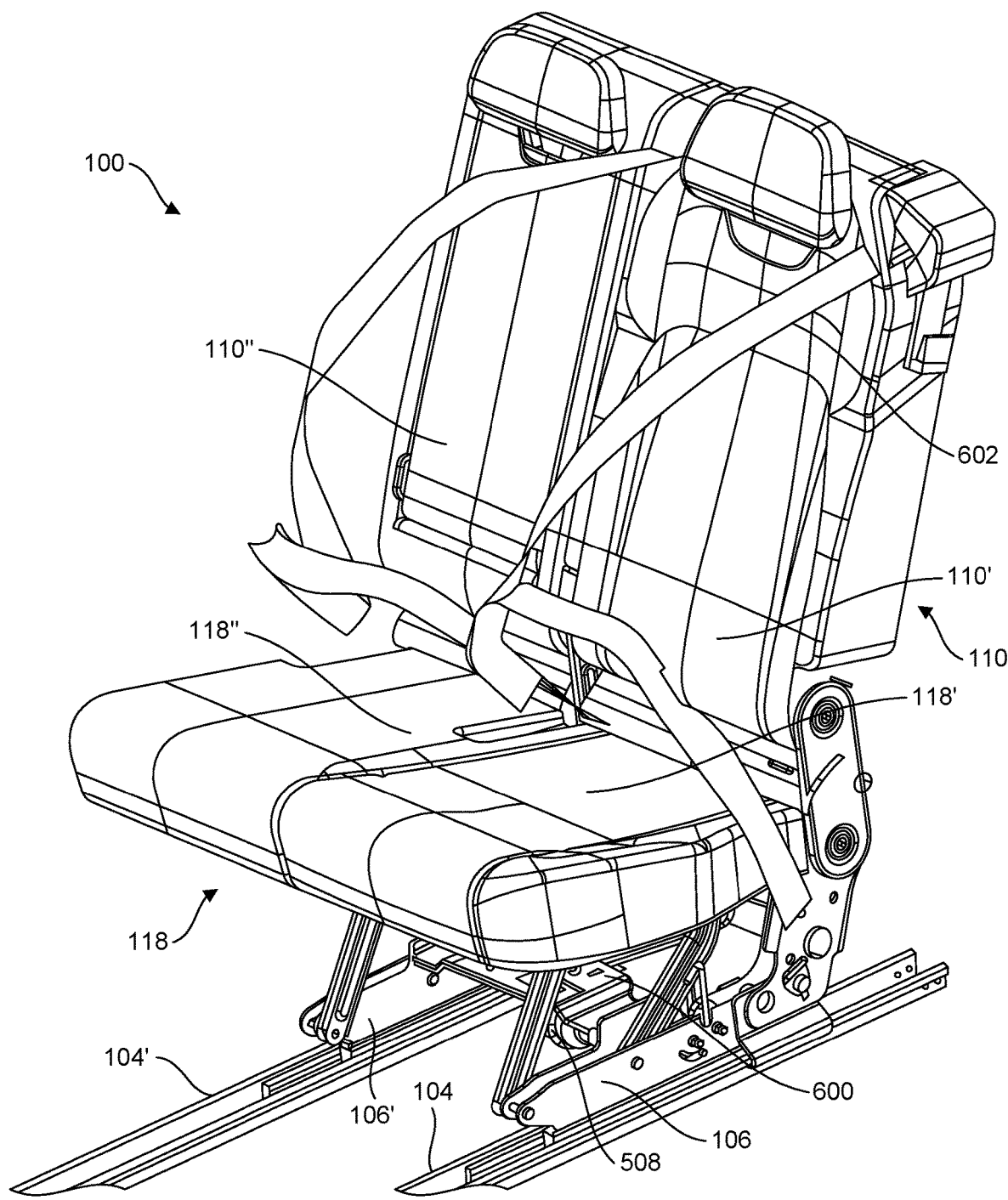
FIG. 6 shows an example of the vehicle seat of FIG. 1 serving as a wider portion of a split seat row in a vehicle.

FIG. 6 shows an example of the vehicle seat 100 of FIG. 1 serving as a wider portion of a split seat row in a vehicle. A split seat row can have two or more portions. Instances of the vehicle seat 100, and/or of another seat described herein, can serve as one or more of such portions. In some implementations, the split seat row includes a wider portion and a narrower portion. For example, the wider portion can correspond to about 60% of the width of the split seat row, and the narrower portion can correspond to about 40% of the width of the split seat row. Other proportions can be used. In some implementations, the vehicle seat 100 is the wider portion of the split seat row. The seatback 110 can include a seatback portion 110' (e.g., corresponding to an outboard seat position) and a seatback portion 110" (e.g., corresponding to a center seat position). The seat cushion 118 can include a seat cushion portion 118' (e.g., corresponding to an outboard seat position) and a seat cushion portion 118" (e.g., corresponding to a center seat position). The center seat having the seatback portion 110" and the seat cushion portion 118" can be cantilevered by the vehicle seat 100. For example, the outboard seat having the seatback portion 110' and the seat cushion portion 118' can be positioned above the rail 104 and a rail 104' on the opposite side, whereas the center seat may not have any rail directly underneath it.

The vehicle seat 100 can include a plate 600 extending between the riser 106 and a riser 106' on the opposite side. For example, the seatbelt retractor 508 can be supported by the plate 600.

The vehicle seat 100 can have one or more seatbelts for the occupant(s). Here, a seatbelt webbing 602 extends initially from the seatbelt retractor 508 underneath the seat cushion portion 118', thereafter extends through the vehicle seat 100 (e.g., between the risers 106 and 106' and inside the seatback portion 110') to a top of the seatback 100 (e.g., at a top of the seatback portion 110'). The seatbelt webbing has anchors at the risers 106 and 106'.

Figure 7:
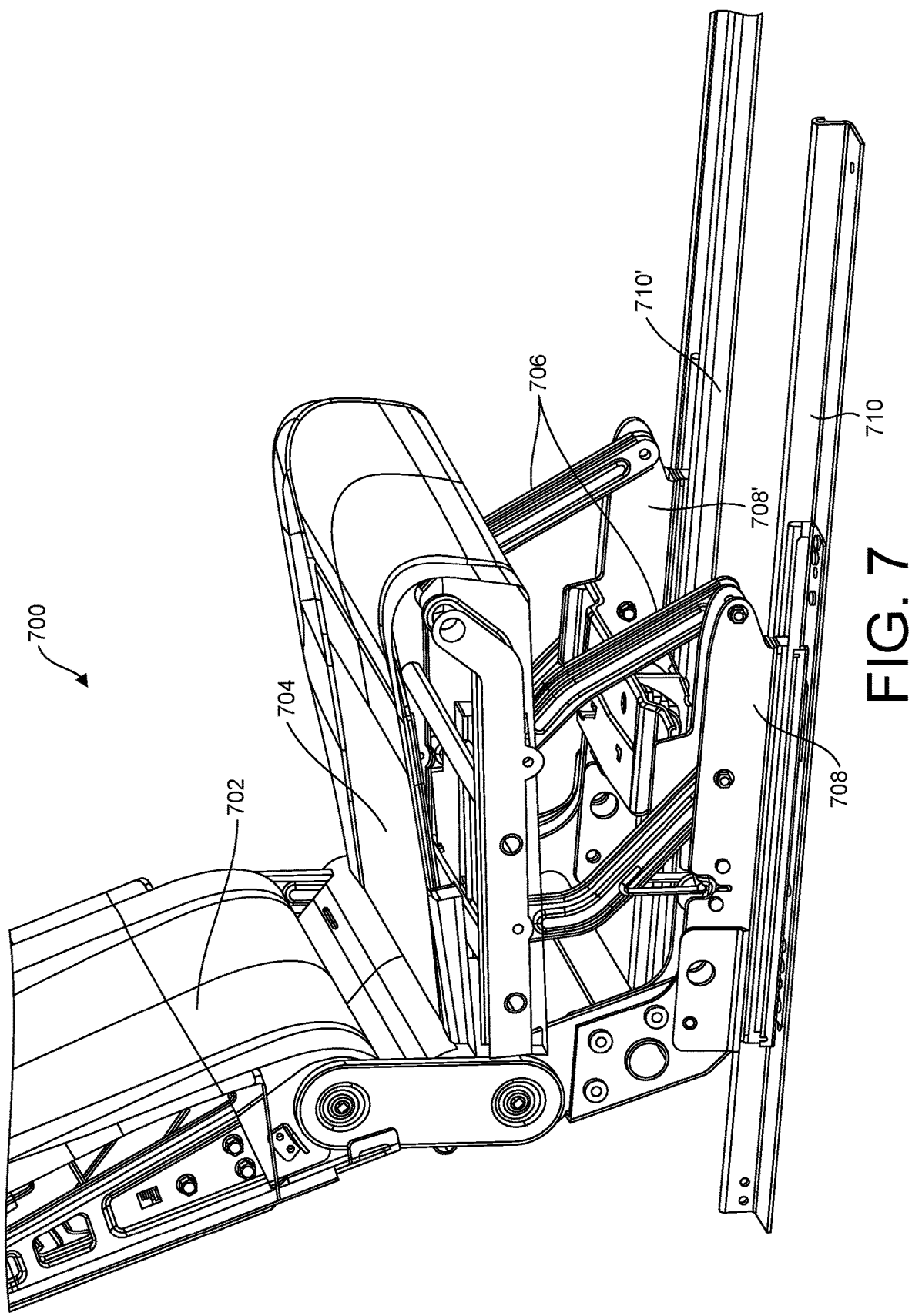
FIG. 7 shows an example of a vehicle seat that can serve as a narrower portion of a split seat row in a vehicle.

FIG. 7 shows an example of a vehicle seat 700 that can serve as a narrower portion of a split seat row in a vehicle. For example, the narrower portion can correspond to about 40% of the width of the split seat row. Other proportions can be used. The vehicle seat 700 can be used with one or more other examples described elsewhere herein. The vehicle seat 700 can have a seatback 702 and a seat cushion 704. The seatback 702 and a seat cushion 704 can be positioned on a four-bar linkage 706 mounted to risers 708 and 708', which engage with rails 710 and 710', respectively. The seat cushion 704 is not attached to the seatback 702 and is not supported by the seatback 702. That is, the seat cushion 704 can be free and does not rest on anything except the four-bar linkage 706.

Figure 8:
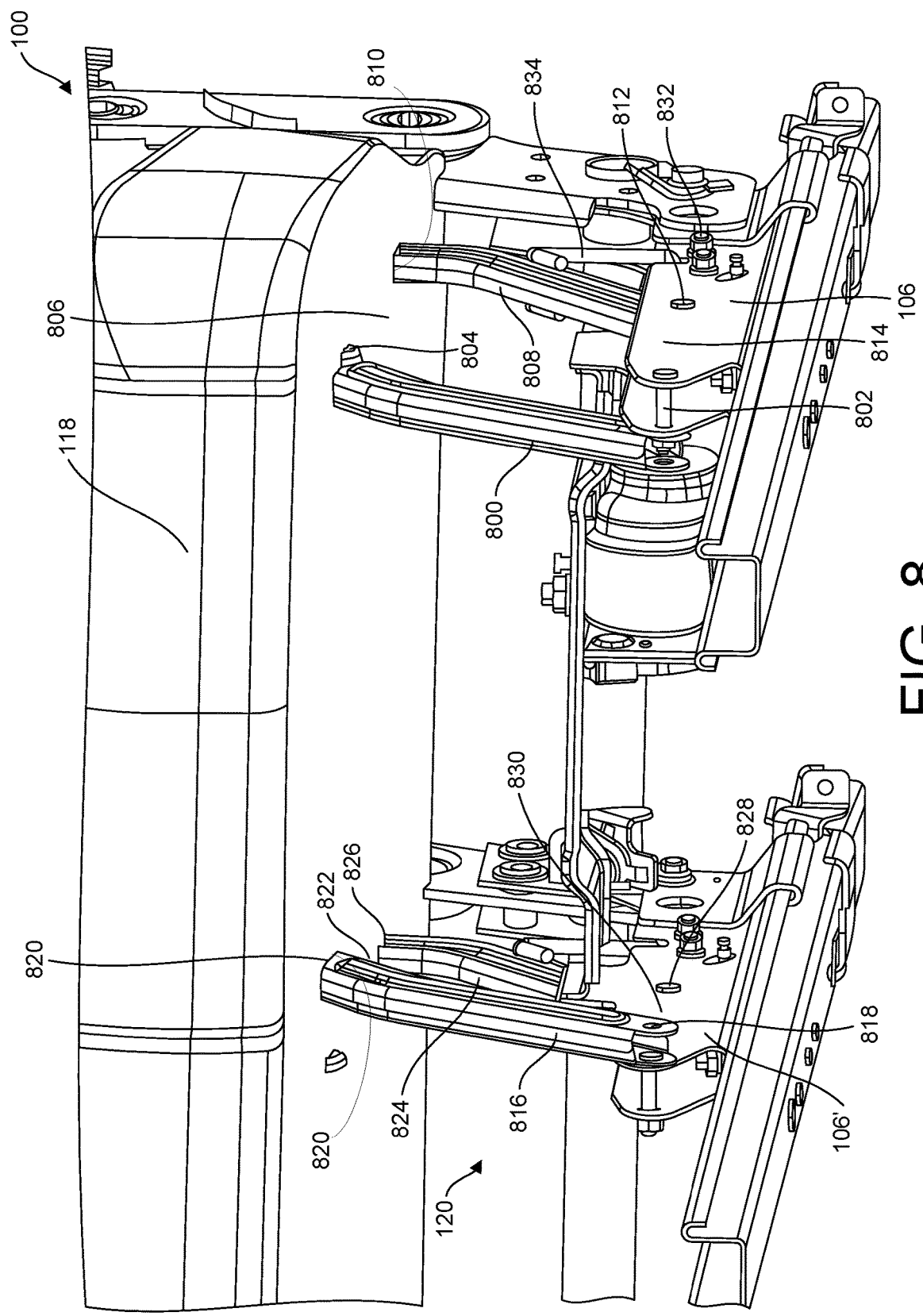
FIGS. 8-9 show examples of the four-bar linkage of the vehicle seat in FIG. 1.
Figure 9:
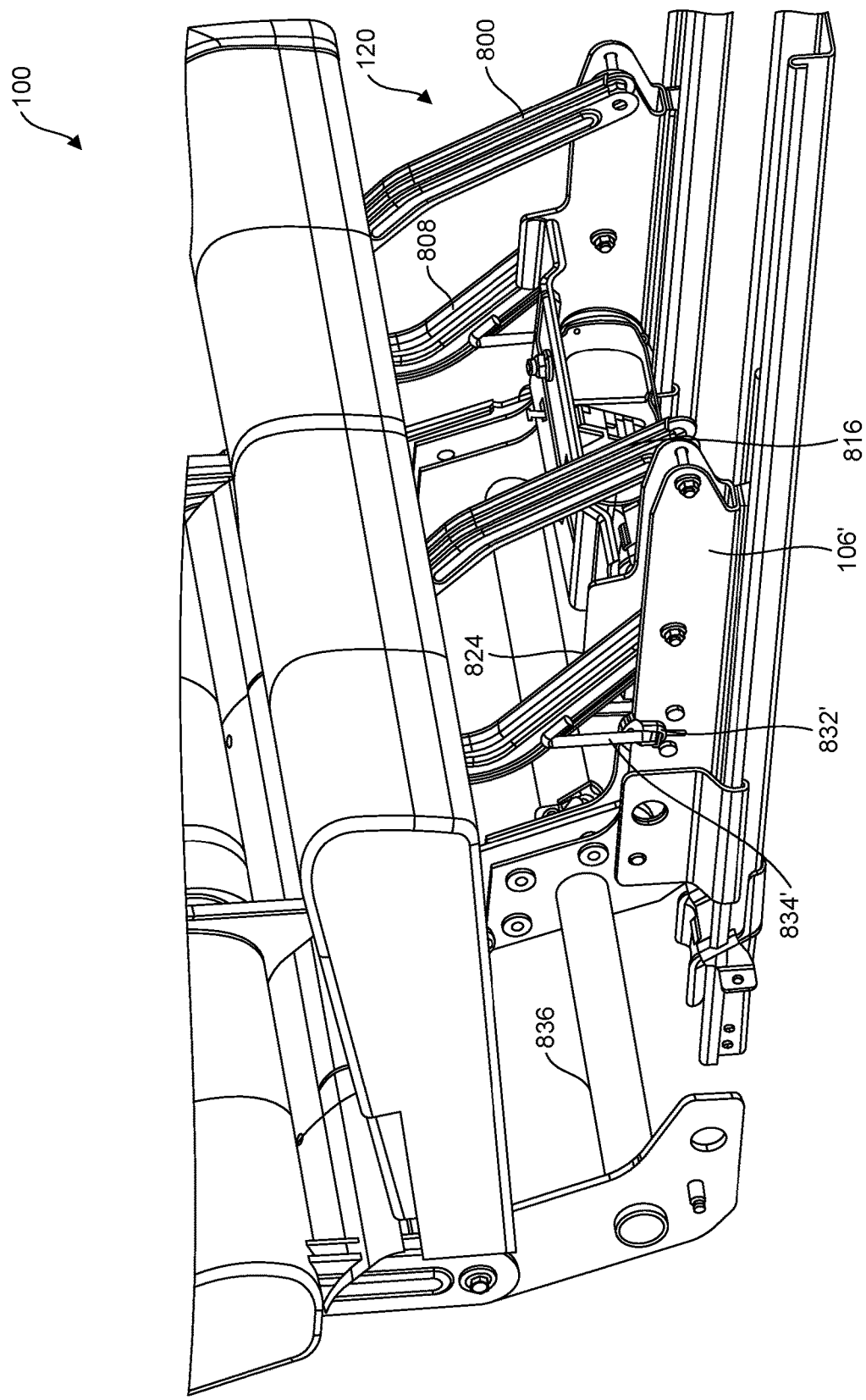

FIGS. 8-9 show examples of the four-bar linkage 120 of the vehicle seat 100 in FIG. 1. In the four-bar linkage 120, three of the four bars can be moveable relative to the riser 106 or 106'. The fourth bar can be part of the riser 106 or 106'.

The four-bar linkage 120 can include a bar 800 extending from a riser pivot 802 on the riser 106 to a seat pivot 804 on a bar 806 on the seat cushion 118.

The four-bar linkage 120 can include a bar 808 extending from a seat pivot 810 on the bar 806 to a riser pivot 812 on the riser 106, wherein the riser 106 forms a bar 814 of the four-bar linkage 120.

The four-bar linkage 120 can include a bar 816 extending from a riser pivot 818 on the riser 106' to a seat pivot 820 on a bar 822 on the seat cushion 118.

The four-bar linkage 120 can include a bar 824 extending from a seat pivot 826 on the bar 822 to a riser pivot 828 on the riser 106', wherein the riser 106' forms a bar 830 of the four-bar linkage 120.

That is, the bars 806 and 822 can be respective parts of the seat cushion 118; the bar 814 can be a part of the riser 106; and the bar 830 can be a part of the riser 106'.

The vehicle seat 100 can have a latch 832 configured to engage with a striker 834. For example, the latch 832 and the striker 834 can selectively latch the four-bar linkage 120 to the riser 106 so that the seat cushion 118 is in the comfort position. Either of the latch 832 and the striker 834 can be positioned on the riser 106, and the other of the latch 832 and the striker 834 can be positioned on the four-bar linkage 120. The vehicle seat 100 can have a latch 832' configured to engage with a striker 834'. For example, the latch 832' and the striker 834' can selectively latch the four-bar linkage 120 to the riser 106' so that the seat cushion 118 is in the comfort position. Either of the latch 832' and the striker 834' can be positioned on the riser 106', and the other of the latch 832' and the striker 834' can be positioned on the four-bar linkage 120.

The vehicle seat 100 can have a cross member 836 extending at least between the risers 106 and 106'. In some implementations, the cross member 836 can extend beyond either or both of the risers 106 or 106'. For example, this can facilitate cantilevering of a seat (e.g., in FIG. 6, the center seat having the seatback portion 110" and the seat cushion portion 118".)

Figure 10:
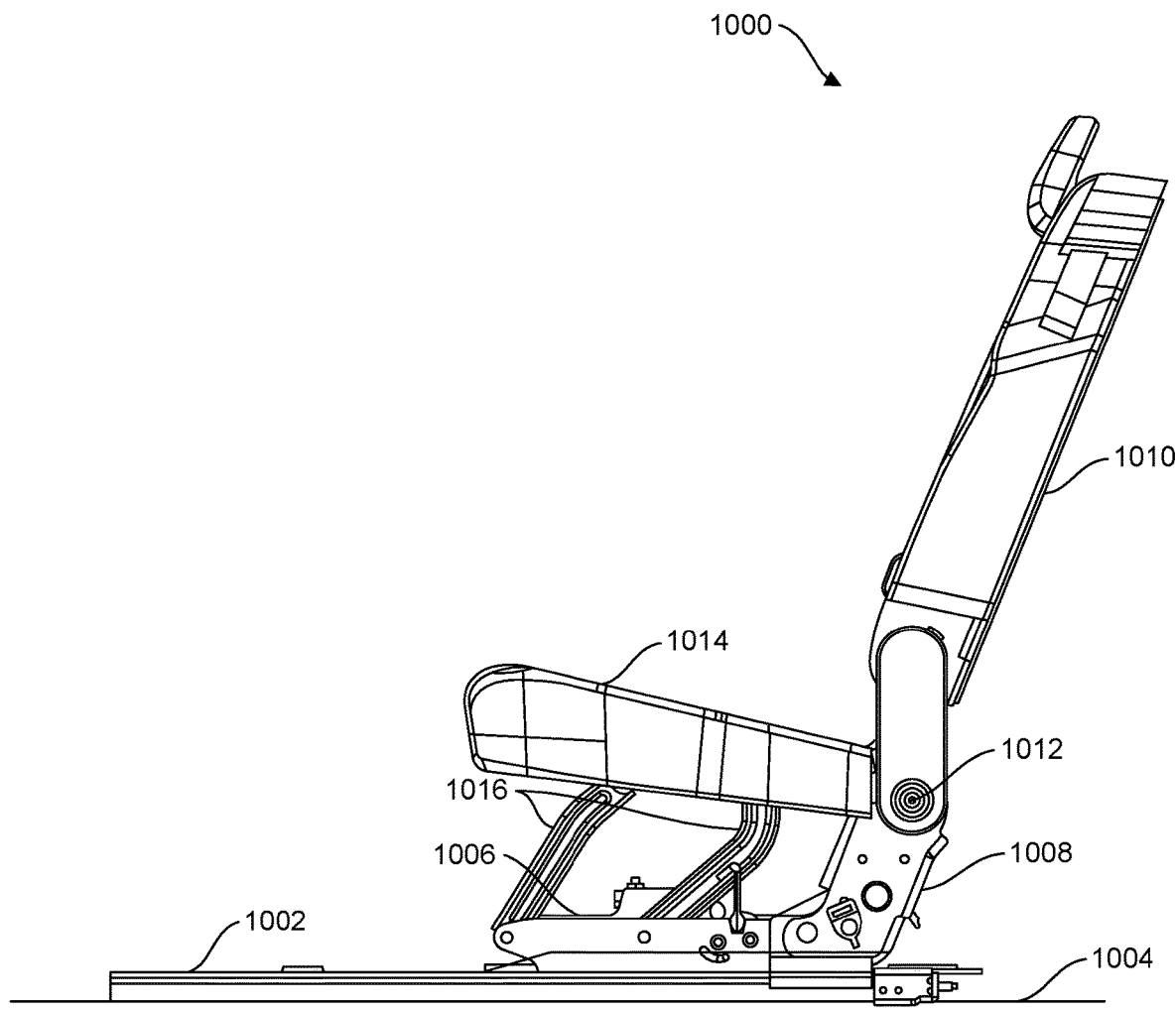
FIG. 10 shows an example of a vehicle seat having only a single pivot.

FIG. 10 shows an example of a vehicle seat 1000 having only a single pivot. The vehicle seat 1000 can be used with one or more other examples described elsewhere herein. Some portions of the vehicle seat 1000 are omitted in the illustrations for clarity. The vehicle seat 1000 is positioned on one or more rails 1002 that are mounted to a floor 1004 of the vehicle. The vehicle seat 1000 can have one or more risers 1006 for engaging with the rail(s) 1002. The vehicle seat 1000 can have a bracket 1008 extending from the riser 1006. The vehicle seat 1000 has a seatback 1010 for supporting the upper body of the occupant. The seatback 1010 can be connected to a pivot 1012. As used herein, the pivot 1012 continues through the seatback 1010 in a direction into the illustration so that the pivot 1012 extends from side to side of the seatback 1010. The pivot 1012 can be used in performing one or more functions of the vehicle seat 1000, including, but not limited to, moving the vehicle seat 1000 into a fold-flat position and/or an easy entry position, or adjusting the seatback 1010 for occupant comfort. The vehicle seat 1000 can have a seat cushion 1014 mounted to the riser 1006 using a four-bar linkage 1016. The seat cushion 1014 is not attached to the seatback 1010 and is not supported by the seatback 1010. That is, the seat cushion 1014 can be free and does not rest on anything except the four-bar linkage 1016.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle seat comprising:
    first and second risers to engage with respective first and second rails on a floor of a vehicle;
    a seatback extending from a first pivot at the first and second risers, wherein the seatback further comprises connection links each having a first end at the first pivot, and each having a second end at a second pivot, wherein a remainder of the seatback is coupled to the second pivot, the connection links positioned at opposite sides of the seatback; and
    a seat cushion mounted to the first and second risers using a four-bar linkage, wherein the seat cushion is not attached to the seatback and is not supported by the seatback;
    wherein the vehicle seat has (i) a comfort position in which a latch holds the seat cushion in a first position relative to the seatback, the seat cushion supported only by the four-bar linkage in the first position, and (ii) a fold-flat position in which the four-bar linkage is folded to position the seat cushion toward the floor, and in which the seatback is folded about the first pivot and assumes a second position at least partially overlapping the seat cushion.

2. The vehicle seat of claim 1, wherein the four-bar linkage comprises:
    a first bar extending from a first riser pivot on the first riser to a first seat pivot on a second bar on the seat cushion;
    a third bar extending from a second seat pivot on the second bar to a second riser pivot on the first riser, wherein the first riser forms a fourth bar of the four-bar linkage;
    a fifth bar extending from a third riser pivot on the second riser to a third seat pivot on a sixth bar on the seat cushion; and
    a seventh bar extending from a fourth seat pivot on the sixth bar to a fourth riser pivot on the second riser, wherein the second riser forms an eighth bar of the four-bar linkage.

3. The vehicle seat of claim 1, wherein the latch is positioned on one of (i) the four-bar linkage or (ii) the first or second risers, and wherein the latch engages with a striker to hold the seat cushion in the first position relative to the seatback, the striker positioned on another one of (i) the four-bar linkage or (ii) the first or second risers.

4. The vehicle seat of claim 3, wherein the vehicle seat comprises first and second latches for the first and second risers, respectively.

5. The vehicle seat of claim 1, further comprising a cross member extending between the connection links.

6. The vehicle seat of claim 5, further comprising at least one child-seat attachment point on the cross member.

7. The vehicle seat of claim 1, wherein orientations of the connection links are adjusted using the second pivot before the seatback is folded about the first pivots and assumes the second position overlapping the seat cushion.

8. The vehicle seat of claim 1, further comprising a first shaft extending along the first pivot, and a second shaft extending along the second pivot.

9. The vehicle seat of claim 1, wherein the second pivot, and not the first pivot, is used for comfort adjustment of the seatback.

10. The vehicle seat of claim 1, wherein the vehicle seat also has (iii) an easy entry position in which the seatback is rotated using the second pivot and the vehicle seat is moved along the first and second rails.

11. The vehicle seat of claim 1, wherein the vehicle seat is part of a split seat row in the vehicle, the split seat row including a wider portion and a narrower portion.

12. The vehicle seat of claim 11, wherein the vehicle seat is the wider portion of the split seat row.

13. The vehicle seat of claim 12, wherein the wider portion of the split seat row further comprises a center seat, the center seat cantilevered by the vehicle seat.

14. The vehicle seat of claim 12, wherein the vehicle seat is the narrower portion of the split seat row.

15. The vehicle seat of claim 1, further comprising a seatbelt retractor supported by a plate extending between the first and second risers.

16. The vehicle seat of claim 15, wherein a seatbelt webbing extends from the seatbelt retractor and through the vehicle seat to a top of the seatback, and wherein the seatbelt webbing has anchors at the first and second risers.

* * * * *